(12) United States Patent
Jones

(10) Patent No.: US 9,672,191 B2
(45) Date of Patent: Jun. 6, 2017

(54) GEOMETRIC COUNTING MECHANISMS

(71) Applicant: John David Jones, Pittsburgh, PA (US)

(72) Inventor: John David Jones, Pittsburgh, PA (US)

( * ) Notice: Subject to any disclaimer, the term of this patent is extended or adjusted under 35 U.S.C. 154(b) by 219 days.

(21) Appl. No.: 14/490,492

(22) Filed: Sep. 18, 2014

(65) Prior Publication Data
US 2015/0100610 A1    Apr. 9, 2015

Related U.S. Application Data

(60) Provisional application No. 61/888,702, filed on Oct. 9, 2013.

(51) Int. Cl.
*G06F 7/00* (2006.01)
*G06F 17/10* (2006.01)
*G06F 7/38* (2006.01)

(52) U.S. Cl.
CPC ............... *G06F 17/10* (2013.01); *G06F 7/38* (2013.01)

(58) Field of Classification Search
USPC .......................................................... 708/204
See application file for complete search history.

(56) References Cited

U.S. PATENT DOCUMENTS

| 4,177,581 A | * | 12/1979 | Walker | G09B 19/02 434/200 |
| 2006/0286515 A1 | * | 12/2006 | Heil | G09B 19/02 434/207 |

* cited by examiner

*Primary Examiner* — Tan V. Mai
(74) *Attorney, Agent, or Firm* — K&L Gates LLP

(57) ABSTRACT

Disclosure for representing one or more numbers as a geometric counting mechanism that comprises an arrangement of geometric shapes and decoding the geometric counting mechanism into the represented number or numbers is provided. Decoding a geometric counting mechanism includes at least identifying a container geometry, determining a primary multiplier, a secondary multiplier, and an additive component value based on the geometric shapes identified in the geometric counting mechanism and their locations in the arrangement. The geometric counting mechanism can be decoded in a clockwise and/or counter-clockwise manner, therefore one geometric counting mechanism can represent more than one number.

20 Claims, 7 Drawing Sheets

GEOMETRIC COUNTING MECHANISMS

CROSS-REFERENCE TO RELATED APPLICATION

This application claims the benefit of U.S. Provisional Application No. 61/888,702 filed Oct. 9, 2013, incorporated by reference herein.

FIELD OF INVENTION

This disclosure relates generally to data representation. In particular, this disclosure relates to representations of alpha-numeric information in an arrangement of geometric shapes.

BACKGROUND

The ten digits commonly used to represent numbers in counting today are generally referred to as the Arabic or Hindu numerals. These are the digits 0, 1, 2, 3, 4, 5, 6, 7, 8, and 9. They are the most common symbolic representation of numbers in the world as of the beginning of the twenty-first century.

With the advent of computers came the binary, octal, hexadecimal, and ASCII systems that represents numbers and/or letters because computing hardware and software are generally easier to designed and be understood with these alternative representations of numbers and/or letters. Examples of these representations include "0101b" is the number "5" in binary, and "1Ah" is the number "26" in hexadecimal.

Numbers, letters and/or other information continue to be represented in different forms, generally to best fit a specific need, purpose, or application. For example, because classical computing executes using "ones and zeros," numbers and/or letters are represented by "ones and zeros". With the growth of quantum computing and Artificial Intelligence, for example, other means to represent numbers and/or letters that would more appropriately fit these applications are desirable.

SUMMARY

In one embodiment, a method for decoding a geometric counting mechanism to determine a represented number is provided. The method includes receiving a geometric counting mechanism that comprises an arrangement of geometric shapes, identifying a first geometric shape that is a polygon in the geometric counting mechanism, determining a base number that corresponds to the number of sides of the identified polygon, and determining a first multiplier that corresponds to a second geometric shape in the center of the polygon. The method further includes determining a second multiplier that corresponds to a third geometric shape on a first vertex of the polygon, determining an additive component value that corresponds to a fourth geometric shape linked to the second geometric shape through a second vertex of the polygon, and determining the represented number using at least the base number, the first multiplier, the second multiplier, and the additive component.

In one aspect of the embodiment, the second multiplier is the number of sides of the third geometric shape and the additive component value is the number of sides of the fourth geometric shape. In another aspect of the embodiment, the first multiplier is the number of sides of the second geometric shape. In yet another aspect of the embodiment, the first multiplier, the second multiplier, or both, is determined by a user. In one embodiment, the user is the operator of the method. For example, the user may be a person using a device implementing the method or a sub-system of the device implementing the method.

In another aspect of the embodiment, the method includes determining a first number based on the location of the first vertex in the polygon and determining a second number based on the location of the second vertex in the polygon. In one embodiment, the vertices on the polygon are numbered in an increasing order in either a clockwise or counter-clockwise direction. The second vertex may coincide with the first vertex, in which case the second number is equal to the first number.

In one embodiment, the represented number is determined by multiplying the primary multiplier with the base number, the second multiplier, and the first number to obtain a first component of the represented number, multiplying the primary multiplier with the additive component value and the second number to obtain a second component of the represented number, and adding the first component to the second component.

In another embodiment, a non-transient computer-readable storage medium having instruction stored therein for performing the method the method for decoding a geometric counting mechanism to determine a represented number, as described in previous paragraphs in this summary section, is provided.

In yet another embodiment, a computing device for decoding a geometric counting mechanism into a represented number is provided. The computing device includes at least a memory and a processing blocks that are respectively adapted to store and execute instructions, including instructions that identify a first geometric shape, that is a polygon, in the geometric counting mechanism comprising an arrangement of geometric shapes, determine a base number that corresponds to the number of sides of the polygon, and determine a first multiplier that corresponds to a second geometric shape in the center of the polygon. The instructions further determine a second multiplier that corresponds to a third geometric shape on a first vertex of the first geometric shape, determine an additive component value that corresponds to a fourth geometric shape linked to the first geometric shape through a second vertex of the first geometric shape, and determine the represented number using at least the base number, the first multiplier, the second multiplier, and the additive component.

In one aspect of the embodiment, the instructions stored and executed in the computing device also determine a first number based on a location of the first vertex in the polygon, and determine a second number based on a location of the second vertex in the polygon, where the vertices of the polygon are numbered in an increasing order a clockwise or counter-clockwise direction.

In one embodiment, the instructions that determine the represented number includes instructions that multiply the primary multiplier with the base number, the second multiplier, and the first number to obtain a first component of the represented number, instructions that multiply the primary multiplier with the additive component value and the second number to obtain a second component of the represented number, and instructions that add the first component to the second component.

In one aspect of the embodiment, the computing device includes an input block adapted for receiving the geometric counting mechanism and an output block adapted for presenting the represented number.

BRIEF DESCRIPTION OF THE DRAWINGS

Non-limiting and non-exhaustive examples of the disclosure are described with reference to the following drawings. In the drawings, like reference numerals refer to like parts throughout the various figures unless otherwise specified. These drawings are not necessarily drawn to scale.

For a better understanding of the disclosure, reference will be made to the following Detailed Description, which is to be read in association with the accompanying drawings, wherein.

DETAILED DESCRIPTION

The following description provides specific details for a thorough understanding of, and enabling description for, various embodiments of the disclosure. One skilled in the art will understand that the disclosure may be practiced without many of these details. It is intended that the terminology used in this disclosure be interpreted in its broadest reasonable manner, even though it is being used in conjunction with a detailed description of certain embodiments of the disclosure. Although certain terms may be emphasized below, any terminology intended to be interpreted in any restricted manner will be overtly and specifically defined as such in this Detailed Description section. The term "based on" or "based upon" is equivalent to the term "based, at least in part, on" and thus includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. The term "geometry" and "geometric shape" are used interchangeably in the disclosure, and both refer to a shape or pattern, regardless whether it is in a closed or open form. The term "side" refers to an unbroken line or segment that forms a part of a geometry or geometric shape. As used in this document, a dot, a circle, and a line may be referred as a geometry or geometric shape.

A geometric counting mechanism may be described as an arrangement of four or more geometric shapes, one being more prominent than the others. In one embodiment, the more prominent geometric shape is a polygon. In the embodiment, a second geometric shape is arranged or located in the center of the polygon, and a third geometric shape is arranged on one of the polygon's vertices. In the embodiment, the fourth geometric shape is arranged outside the polygon, but linked to the second geometric shape in the center of the polygon with a line through one of the polygon's vertices. An arrangement of these 4 (four) geometric shapes may be referred to as a geometric counting mechanism. More geometric shapes may be arranged as a geometric counting mechanism, however.

A number may be represented by a geometric counting mechanism through the selection and arrangement of at least four geometric shapes. A geometric counting mechanism, therefor, may be decoded into the represented number by identifying and evaluating the four or more geometric shapes, as well as their arrangement in the geometric counting mechanism. Although integers, positive, and real numbers are used in this document as examples of the numbers represented by geometric counting mechanisms, it is contemplated that a geometric counting mechanism may represent a fraction, negative, or complex number. Examples of individual geometric counting mechanism are shown in FIGS. 1A, 1B, and 1C.

Figure 1A:
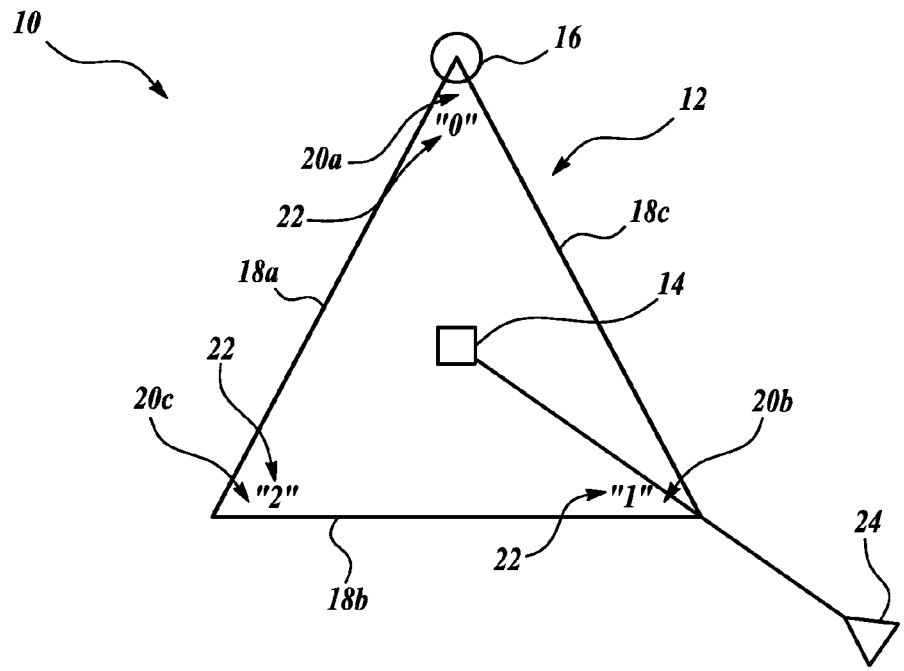
FIG. 1A is a diagram illustrating one example of a geometric counting mechanism.
Figure 1B:
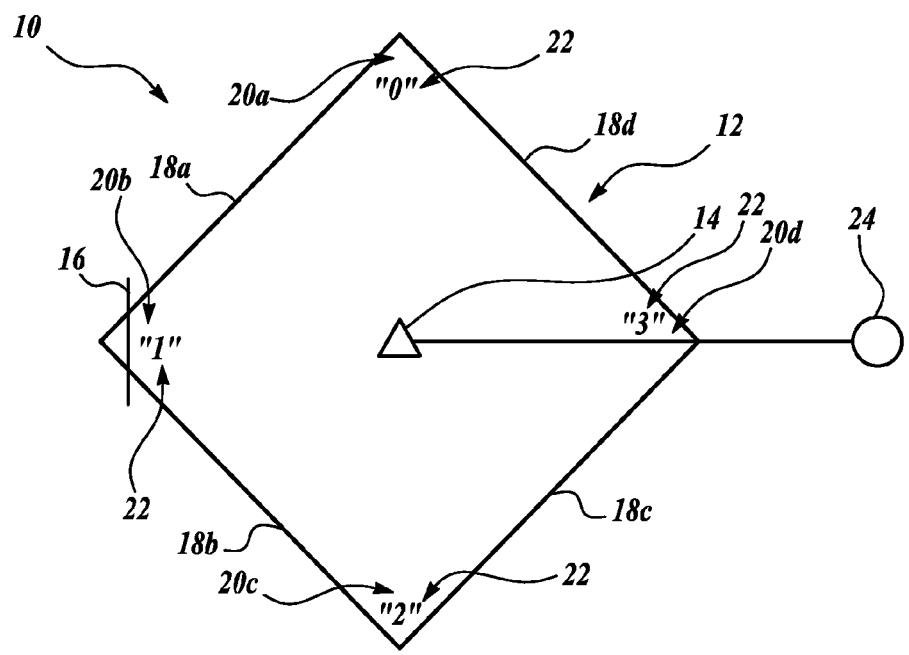
FIG. 1B is a diagram illustrating another example of a geometric counting mechanism.
Figure 1C:
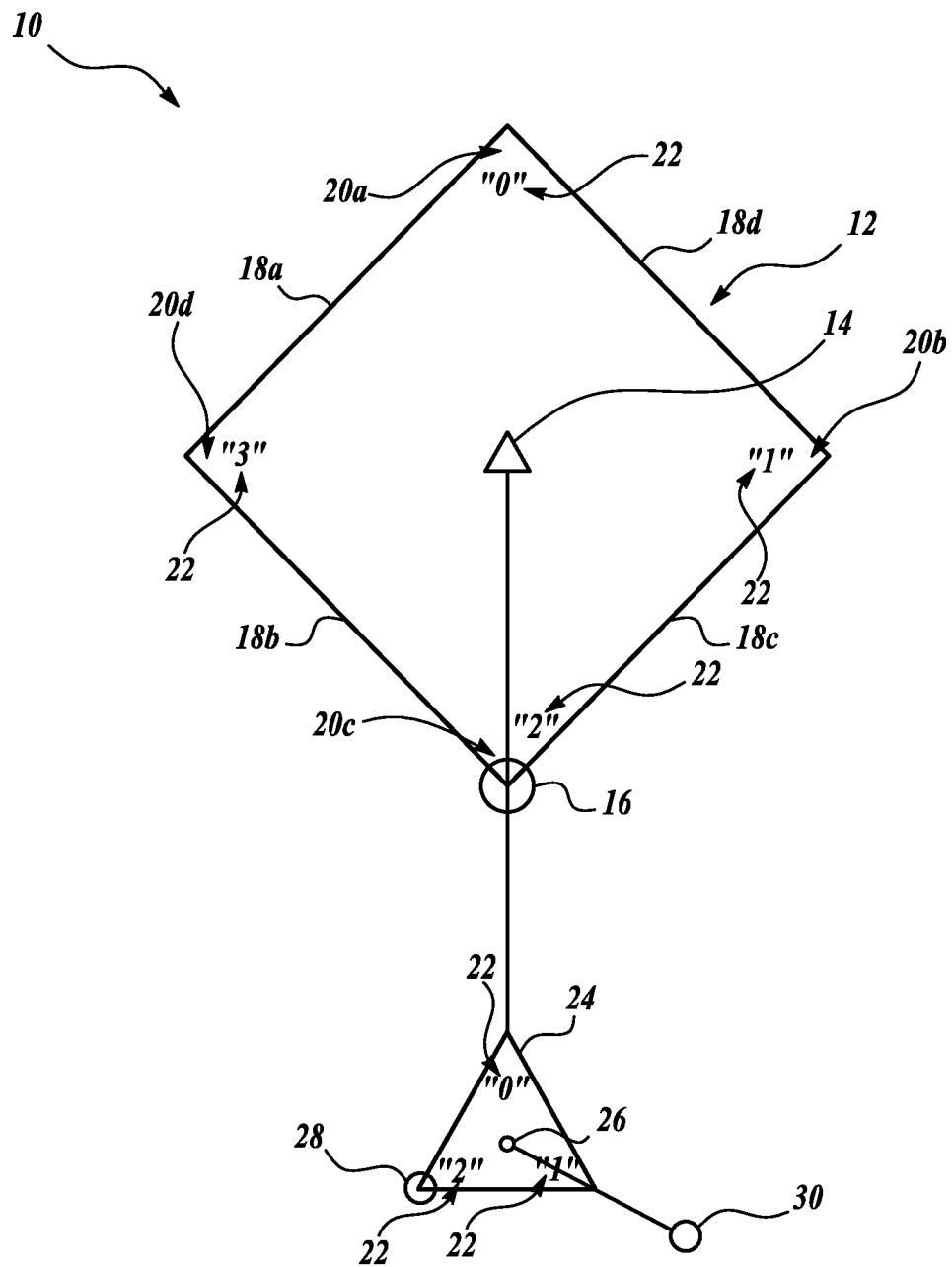
FIG. 1C is a diagram illustrating one example of a nested geometric counting mechanism.

FIG. 1A illustrates an example of geometric counting mechanism 10. Geometric counting mechanism 10 includes container geometry 12, primary multiplier geometry 14, secondary multiplier geometry 16, and additive component geometry 20. As shown in FIG. 1A, container geometry 12 is the prominent geometric shape in geometric counting mechanism 10, and in one embodiment, container geometry 12 is a polygon. Primary multiplier geometry 14 is a geometric shape located in the center of container geometry 12. As shown in FIG. 1A, container geometry 12 is a triangle constructed by three sides 18a, 18b, 18c forming three vertices 20a, 20b, 20c. It is contemplated, however that container geometry 12 is of a different geometry or geometric shape. Container geometry 12 may also be a three, or higher, dimensional geometry, a polyhedron, or a polytope. Surfaces on a three dimensional geometry may also be considered as sides, and the intersections of sides may be considered as vertices.

As shown in FIG. 1, because container geometry 12 has three sides, a base number of 3 (three) is determined. The base number may be used in decoding geometric counting mechanism 10, and/or in determining the number represented by geometric counting mechanism 10. The details on how the base number is used to determined the number represented by a geometric counting mechanism for will be discussed in later paragraphs.

As shown in FIG. 1A, primary multiplier geometry 14, another geometric shape arranged in geometric counting mechanism 10, is a rectangle. Primary multiplier geometry 14 may also be of other geometry or geometric shape, for example, a circle, a triangle, a pentagon, and the like. Each geometry has a number of sides, for example, a circle has 1 (one) side, a triangle 3 (three), and a pentagon 5 (five). The number of sides of primary multiplier geometry 14 may be determined as the primary multiplier of geometric counting mechanism 10.

In one embodiment, the primary multiplier is used to decode and/or to determine the number represented by geometric counting mechanism 10. As shown in FIG. 1A, because primary multiplier geometry 14 is a rectangle, the primary multiplier is 4 (four). For purposes of decoding a geometric counting mechanism, the shape of primary multiplier geometry 14 may establish the fundamental unit for decoding the geometric counting mechanism.

The fundamental unit may be the primary multiplier that is dictated by primary multiplier geometry 14. It is also contemplated, however, that the primary multiplier, and thus the fundamental unit, of a geometric counting mechanism is unrelated to primary multiplier geometry 14. It is also contemplated that the primary multiplier of a geometric counting mechanism, and thus its fundamental unit, may be defined without regard to the geometric counting mechanism itself. In one embodiment, the primary multiplier of a geometric counting mechanism may be preset to a particular number before primary multiplier geometry 14 of the geometric counting mechanism is determined. The details on how the primary multiplier is used to determined the number represented by a geometric counting mechanism will be discussed in later paragraphs.

Secondary multiplier geometry 16 as shown in FIG. 1A, another geometric shape arranged in geometric counting mechanism, is a circle. Secondary multiplier geometry 16, however, may be of any geometry or geometric shape, for example, a line, a chevron, a square, and the like, each of which having a number of sides, for example, respectively, 1, 2, 4 and the like. The number of sides associated with secondary multiplier geometry 16 may be referred to as the second multiplier of geometric counting mechanism 10. As shown in FIG. 1A, the second multiplier of geometric counting mechanism 10 is 1 because secondary multiplier geometry 16 is a circle with 1 (one) side. It is contemplated, however, that the second multiplier of a geometric counting mechanism may be unrelated to secondary multiplier geometry 16. The second multiplier of a geometric counting mechanism may be defined and/or preset for one or more geometric counting mechanisms before secondary multiplier geometry 16 is determined. Second multiplier geometry 16 is arranged or located on one of the vertices of container geometry 12.

In one embodiment, the second multiplier associated with second multiplier geometry 16 may be used to decode geometric counting mechanism 10 and/or to determine the number represented by geometric counting mechanism 10. In one aspect of the embodiment, the second multiplier is used together with the location of secondary multiplier geometry 16 on container geometry 12 in decoding geometric counting mechanism 10.

Container geometry 12 in FIG. 1A has three vertices 20a, 20b, 20c, which are assigned vertex designators 22. Vertex designators 22 are integers or whole numbers assigned to each vertex of the container geometry in an orderly increasing manner, starting with the number 0, in a clockwise or counterclockwise direction. For example, the vertex designators of 0, 1, and 2 are assigned to the vertices 20a, 20b, and 20c respectively in a clockwise direction in FIG. 1A. A geometric counting mechanism may be referred to as a clockwise geometric counting mechanism when the vertex designators on the container geometry are assigned in the clockwise direction. Alternatively, a geometric counting mechanism may be referred to as a counterclockwise geometric counting mechanism when the vertex designators on the container geometry are assigned in the clockwise direction. In one embodiment, vertex designator of 0 is assigned to the topmost vertex on the container geometry. It is contemplated, however, that a vertex designator of 0 is assigned to any one vertex on the container geometry.

As shown in FIG. 1A, secondary multiplier geometry 16, a geometric shape in geometric counting mechanism 10, is arranged or located on vertex 20a of container geometry 12, thus it is assigned vertex designator of 0. The vertex designator of 0 may be used together with the secondary multiplier to decode geometric counting mechanism 10. The details on how the vertex designator associated with the secondary multiplier geometry 16 and the second multiplier are used in determining the number represented by a geometric counting mechanism will be discussed in later paragraphs.

Additive component geometry 24, another geometric shape arranged in geometric counting mechanism 10, may be of any geometry or geometric shape, with one or more sides. The additive component value of geometric counting mechanism 10 may be associated with additive component geometry 24. It is also contemplated that the additive component value of geometric counting mechanism 10 is unrelated to additive component geometry 24, and/or is predetermined by a user. As shown in FIG. 1A, additive component geometry 24 is a triangle, thus an additive component value of 3 (three) may associated with additive component geometry 24. Although additive component geometry 24 is shown as a two dimensional shape in FIG. 1A, it is also contemplated that additive component geometry 24 is of a three or higher dimensional geometry or geometric shape.

In one embodiment, additive component geometry 24 is linked to primary multiplier geometry 14 through one of the vertices of container geometry 12. Additive component geometry 24 as shown in FIG. 1A is linked to primary multiplier geometry 14 through vertex 20b that is assigned the vertex designator of 1. Additive component geometry 24 may also be linked to primary multiplier geometry 14 through vertex 20a or vertex 20c. The vertex designator assigned to the vertex through which additive component geometry 24 is linked to primary multiplier geometry 14 may be used to decode geometric counting mechanism 10 and/or to determine the number represented by geometric counting mechanism 10. In one example, as shown in FIG. 1A, an additive component value of 3 (three) and vertex designator of 1 would be used to decode geometric counting mechanism 10. The details on how the vertex designator associated with additive component geometry 24 and the additive component value are used to decode a geometric counting mechanism will be discussed in later paragraphs.

FIG. 1B illustrates another example of geometric counting mechanism 10 having a plurality of sides 18a, 18b, 18c, 18dm and vertices 20a, 20b, 20c, 20d each with vertex designator 22. In FIG. 1B, geometric counting mechanism 10 includes container geometry 12 that has 4 (four) sides, primary multiplier geometry 14 that has 3 (three) sides, secondary multiplier geometry 16 that has 1 (one) side), and additive component geometry 24 that has 1 side. Geometric counting mechanism 10 in FIG. 1B is a counterclockwise geometric counting mechanism, and second multiplier geometry 16 is located at a vertex with a vertex designator of 1, and additive component geometry 24 is linked to primary multiplier geometry 14 through a vertex with vertex designator of 3. In one embodiment, the secondary multiplier of geometric counting mechanism 10 in FIG. 1B is predetermined to be 2 (two) and thus unrelated to secondary multiplier geometry 16, and/or it is not the number of sides of secondary multiplier geometry 16. In one aspect of the embodiment, geometric counting mechanism 10 in FIG. 1B is decoded using a base number of 4, a primary multiplier of 3, a secondary multiplier of 2 with a vertex designator of 1, and an additive component value of 1 with a vertex designator of 3.

A geometric counting mechanism may use concentric and nested literal geometric shapes to express, accumulate, and manipulate alphanumeric information. In one embodiment, one or more geometric shapes may be nested in a base geometric counting mechanism to expand the range and permutations of the numbers it represents. In one example, by including an base additive component geometry that itself has a geometric shape in its center, a geometric shape on one of its vertices, and a geometric shape as its nested additive component, a geometric counting mechanism may represent a number larger than if the based additive component geometry does not include those additional geometric shapes. FIG. 1C illustrates an example of a nested, or multi-level, geometric counting mechanism 10.

In FIG. 1C, geometric counting mechanism 10 is constructed of a plurality of sides 18a, 18b, 18c, 18d, and a plurality of vertices 20a, 20b, 20c, 20d each having vertex designator 22. Geometric counting mechanism 10 in FIG. 1C includes container geometry 12 having 4 (four) sides, primary multiplier geometry 14 having 3 (three) sides, secondary multiplier geometry 16 on having 1 (one) side and vertex designator of 2, and additive component geometry 24 having 3 (three) sides and vertex designator of 2. Additive component geometry 24 includes a nested primary multiplier geometry 26 that is a circle having 1 (one) side, a nested secondary multiplier geometry 28 that is a circle having 1 (one) side and vertex designator 22 of 2, and nested additive component 30 that is a circle having 1 (one) side and vertex designator 22 of 1. Geometric counting mechanism 10 as shown in FIG. 1C may be decoded by reading its various geometry from the "outside-in", determining its additive component value by evaluating additive component geometry 24 as a nested geometric counting mechanism, before determining the number represented by geometric counting mechanism 10. It is contemplated that nested additive component 30 may also comprise additional geometric shapes creating additional levels of nesting.

It is contemplated that one geometric counting mechanism may represent more than one number. In one embodiment, a geometric counting mechanism may represent a first number when it is decoded one way, and represent a second number when it is decoded another way. Preferably, the first number is distinct from the second number, although the first number may be equal to the second number. A geometric counting mechanism may be decoded one way when its vertex designators are assigned to the vertices of its container geometry in a clockwise direction, and another way when its vertex designators are assigned to the vertices of its container geometry in a counterclockwise direction. In one embodiment, at any one time, a geometric counting mechanism may be considered to represent a "clockwise number", a "counterclockwise number", or a "superposition of clockwise number and counterclockwise number."

Decoding and/or determining the number represented by a single level geometric counting mechanism may carried out by applying the following equation:

$N_R=(PM \times BN \times SM \times V_{SM})+(PM \times AC \times V_{AD})$

Where
$N_R$=Represented Number; the number represented by the geometric counting mechanism.
PM=Primary Multiplier or the first multiplier, associated with the primary multiplier geometry in the geometric counting mechanism.
BN=Base Number; the base number associated with the container geometry of the geometric counting mechanism.
SM=Secondary Multiplier or the second multiplier, associated with the secondary multiplier geometry in the geometric counting mechanism.
AC=Additive Component value associated with the additive component geometry in the geometric counting mechanism.
$V_{SM}$=Vertex designator of the secondary multiplier geometry.
$V_{AC}$ Vertex designator associated with the additive component geometry.

In one example, geometric counting mechanism 10 in FIG. 1A may be decoded and/or the number represented by geometric counting mechanism 10 may be determined as follow:
BN=3
PM=4
SM=1
AC=3
$V_{SM}$=0 (clockwise assignment of vertex designators)
$V_{AC}$=1 (clockwise assignment of vertex designators)

$N_R=(PM \times BN \times SM \times V_{SM})+(PM \times AC \times V_{AC})$ $NR=(4 \times 3 \times 1 \times 0)+(4 \times 3 \times 1)=12$ In this example, the number represented by geometric counting mechanism 10 in FIG. 1A is 12.

Geometric counting mechanism 10 in FIG. 1A may also represent a different number if vertex designators of its container geometry are assigned in the counterclockwise direction, in which case, although the vertex designator for the secondary multiplier geometry remains "0", the vertex designator associated with the additive component geometry changes to "2")
BN=3
PM=4
SM=1
AC=3
$V_{SM}$=0 (counterclockwise assignment of vertex designators)
$V_{AC}$=2 (counterclockwise assignment of vertex designators)

$N_R=(PM \times BN \times SM \times V_{SM})+(PM \times AC \times V_{AC})$ $NR=(4 \times 1 \times 0)+(4 \times 3 \times 2)=24$ A ratio or fraction notation, with the represented number determined one way being the numerator and the represented number determined another way being the denominator, may be ascribed to any particular geometric counting mechanism. In one embodiment, the represented number determined one way is determined with the vertex designators assigned in a clockwise direction, and the represented number determined another way is determined with the vertex designators assigned in a counterclockwise direction. For examples, using the determinations made above, the ratio of "12/24" may be given to geometric counting mechanism 10 in FIG. 1A.

In another example, geometric counting mechanism 10 with a predetermined/preset secondary multiplier of "2" in FIG. 1B may be decoded, and the number represented by geometric counting mechanism 10 be determined, as follow (recall that because the secondary multiplier is predetermined to be 2 instead of it being the number of sides of secondary multiplier geometry 16, SM is 2 instead of 1):
BN=4
PM=3
SM=2
AC=1
$V_{SM}$=1 (counterclockwise assignment of vertex designators)

$V_{AC}$=3 (counterclockwise assignment of vertex designators)

$$N_R=(PM \times BN \times SM \times V_{SM})+(PM \times AC \times V_{AC})$$

$$NR=(3 \times 4 \times 2 \times 1)+(3 \times 1 \times 3)=33$$

To decode a nested geometric counting mechanism 10 in FIG. 1C, a more general equation is provided below:

$$N_R=(PM \times BN \times SM \times V_{SM})+(PM \times ((NPM \times AC \times NSM \times NVSM)+(NPM \times AC \times NV_{AC})) \times V_{AC})$$

Wherein
 NPM=Nested Primary Multiplier or the first multiplier in the additive component, associated with a primary multiplier geometry in the additive component.
 NSM=Nested Secondary Multiplier or the second multiplier in the additive component, associated with a secondary multiplier geometry in the additive component.
 NAC=Nested Additive Component value associated with a nested additive component geometry in the additive component.
 $NV_{SM}$=Nested Vertex designation number of the nested secondary multiplier geometry.
 $NV_{AC}$=Nested Vertex designation number of the nested additive component geometry.

In one embodiment, geometric counting mechanism 10 in FIG. 3C may represent a number as determined below:
 BN=4
 PM=3
 SM=1
 AC=3
 $V_{SM}$=2 (clockwise assignment of vertex designators)
 $V_{AC}$=2 (clockwise assignment of vertex designators)
 NPM=1
 NSM=1
 NAC=1
 $NV_{SM}$=2 (counterclockwise assignment of vertex designators)
 $NV_{AC}$=1 (counterclockwise assignment of vertex designators)

$$NR=(3 \times 4 \times 1 \times 2)+(3 \times (1 \times 3 \times 1 \times 2)+(1 \times 1 \times 1)) \times 2=66$$

Because vertex designators may be assigned either in a clockwise or counterclockwise direction, a nested geometric counting mechanism with a plurality of geometric shapes with vertex designators, may be decoded into a plurality of numbers. In one embodiment, each nested component may represent its own plurality of number, preferably two. A geometric counting mechanism with one level of nesting, for example, a nested additive component, may represent four (4) different numbers based on four possible combinations of vertex designators assignments. The four combinations in this example may include (1) clockwise in the container geometry+clockwise in the additive component geometry, (2) clockwise in the container geometry+counterclockwise in the additive component geometry, (3) counterclockwise in the container geometry+clockwise in the additive component geometry, and (4) counter clockwise in the container geometry+counterclockwise in the additive component geometry.

It is contemplated that the quantity of numbers represented by one nesting geometric counting mechanism may grow exponentially with the number of nested additive components. Each additional nested additive component geometry in a geometric counting mechanism may double the numbers the geometric counting mechanism represent.

Figure 2:
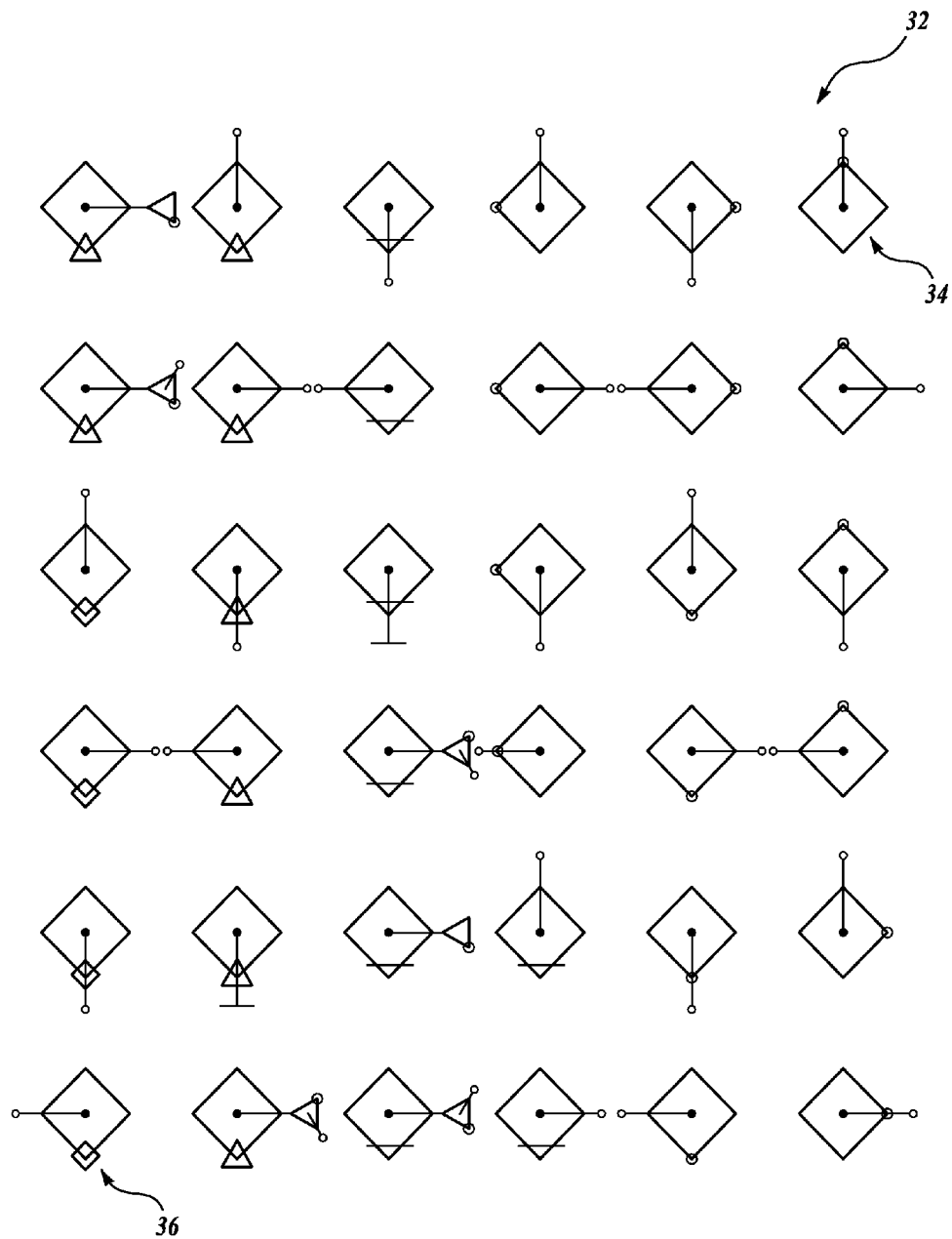
FIG. 2 illustrate an example of a set of geometric counting mechanisms according to one embodiment.

A set or grouping of geometric counting mechanisms may be created to represent certain grouping of numbers and/or alphabets. Preferably, the geometric counting mechanism in the set are created with identical container geometries, a common fundamental unit, distinct secondary multipliers, and distinct additive components. FIG. 2 illustrates a set or collection of 36 (thirty-six) geometric counting mechanisms 32, with a clockwise vertex designators assignment, that represents the digits 0 through 9, and the letters A through Z. The geometric counting mechanisms in FIG. 2 have identical container geometries, diamonds, thus each of the geometric counting mechanism in the set has a base number of "4". The geometric counting mechanisms in the set of FIG. 2 also have identical primary multiplier geometries, a dot or circle, in the center of their container geometries, and thus, each geometric counting mechanism in the set has the number 1 (the number of sides in a circle) as its primary multiplier or fundamental unit.

In one aspect of the embodiment, the set of geometric counting mechanisms may include a variety of secondary multipliers. As shown in FIG. 2, some of the geometric counting mechanisms in the set 32 include secondary multiplier geometries in the shape of a circle, while other geometric counting mechanisms in the set include secondary multiplier geometries in the shape of a line, a triangle, and a rectangle. A set of geometric counting mechanisms may include more than one secondary multiplier geometry, and each secondary multiplier geometry may be included in any number of geometric counting mechanisms in the set. For example, as shown in FIG. 2, the "circle" secondary multiplier geometry is included in a subset of 16 (sixteen) geometric counting mechanisms in the set, the "line" secondary multiplier geometry is included in a subset of 8 (eight) geometric counting mechanisms in the set, the "triangle" secondary multiplier geometry is included in another subset of 8 (eight) geometric counting mechanisms in the set, and the "rectangle" secondary multiplier geometry is included in a subset of 4 (four) geometric counting mechanism.

A set of geometric counting mechanisms may also include a variety of additive component geometries. As shown in FIG. 2, various additive component geometries, and even nesting additive components, are included in the set 32. Because of the flexibility of selecting geometries to be included in a geometric counting mechanism, an alphanumeric information may be represented by different arrangements of geometric shapes in a geometric counting mechanism. This variety of geometric shapes that may be included and arranged in a geometric counting mechanism provide for certain freedom in constructing a geometric counting mechanism and/or a set of geometric counting mechanism.

The degree of freedom in selecting geometric shapes to construct a geometric counting mechanism to represents a number is not infinite. A selection of the first geometry to include in a geometric counting mechanism may limit the selection of other geometries for inclusion in the geometric counting mechanism. Based on the selection of the container geometry and a primary multiplier geometry, a secondary multiplier geometry may be selected and placed on a certain vertex on the container geometry. With those geometries in place, the additive component value for the geometric counting mechanism may be selected, and determination may be made on whether some nesting is needed based on the number the geometric counting mechanism represents. The equation(s) used to decode a geometric counting mechanism may provide the framework, and assist, in the selection of the geometries to be included and their arrangement in the geometric counting mechanism.

Limits on choices of geometries to use may also be dictated by the technology or application that for which the geometric counting mechanisms are used. Constraints on the geometries to be included when geometric counting mechanisms are used for memory structure may differ from constraints on geometries when used in molecule building.

The set of geometric counting mechanisms 32 in FIG. 2 may be decoded, with a clockwise vertex designators assignment, into the sequential numbers 0 through 35, starting with the first geometric counting mechanism 34, and ending with the last geometric counting mechanism 36. The same set in FIG. 2, however, may be decoded into 36 (thirty-six) numbers that are different from the numbers 0 to 35, with a counterclockwise vertex designator assignment. The last geometric counting mechanism 36, for example, may be determined to represent the numbers 35 and 41.

Figure 3A:
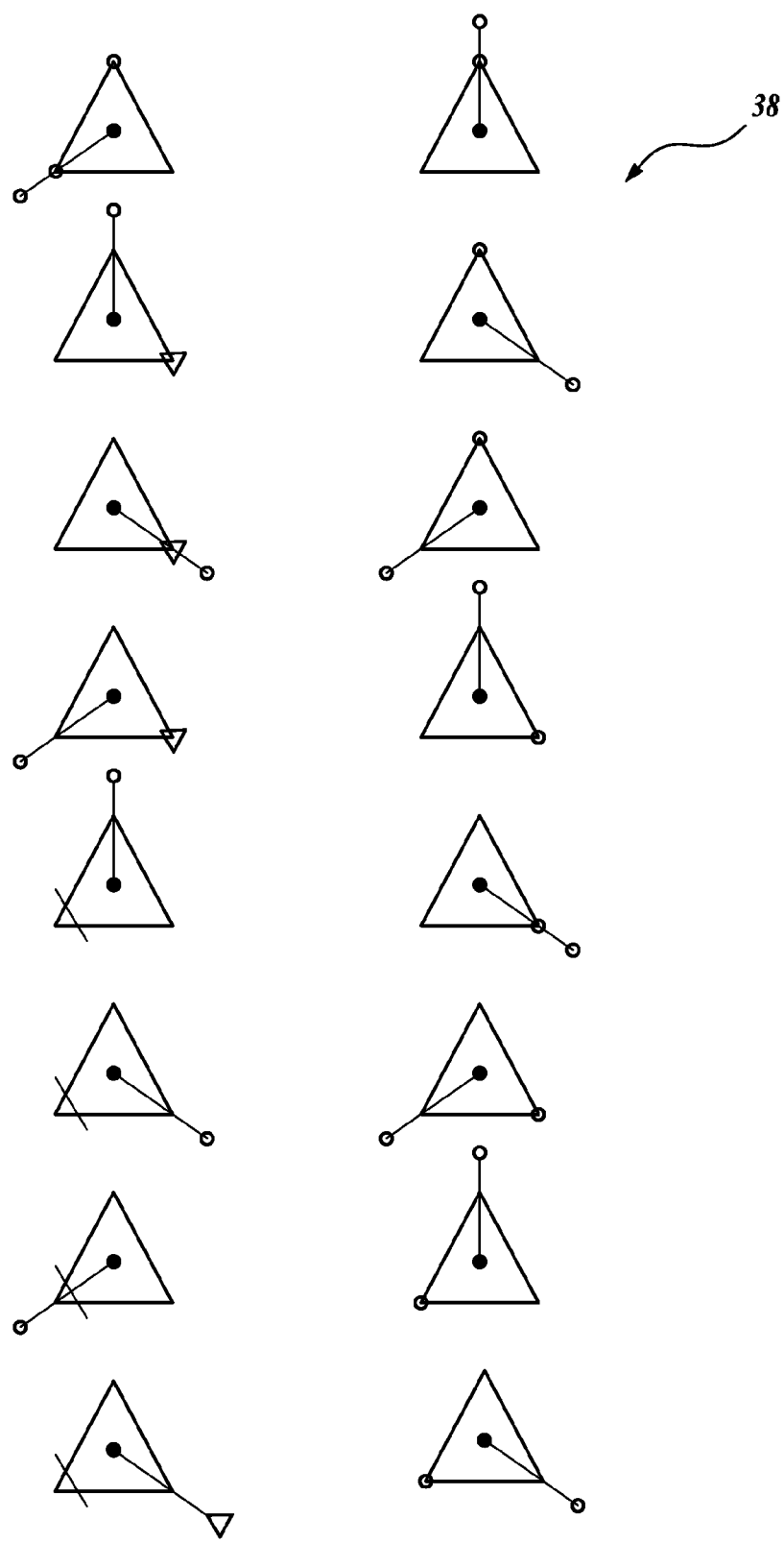
FIG. 3A illustrates an example of a set of geometric counting mechanisms for a hexadecimal numerals according to one embodiment.
Figure 3B:
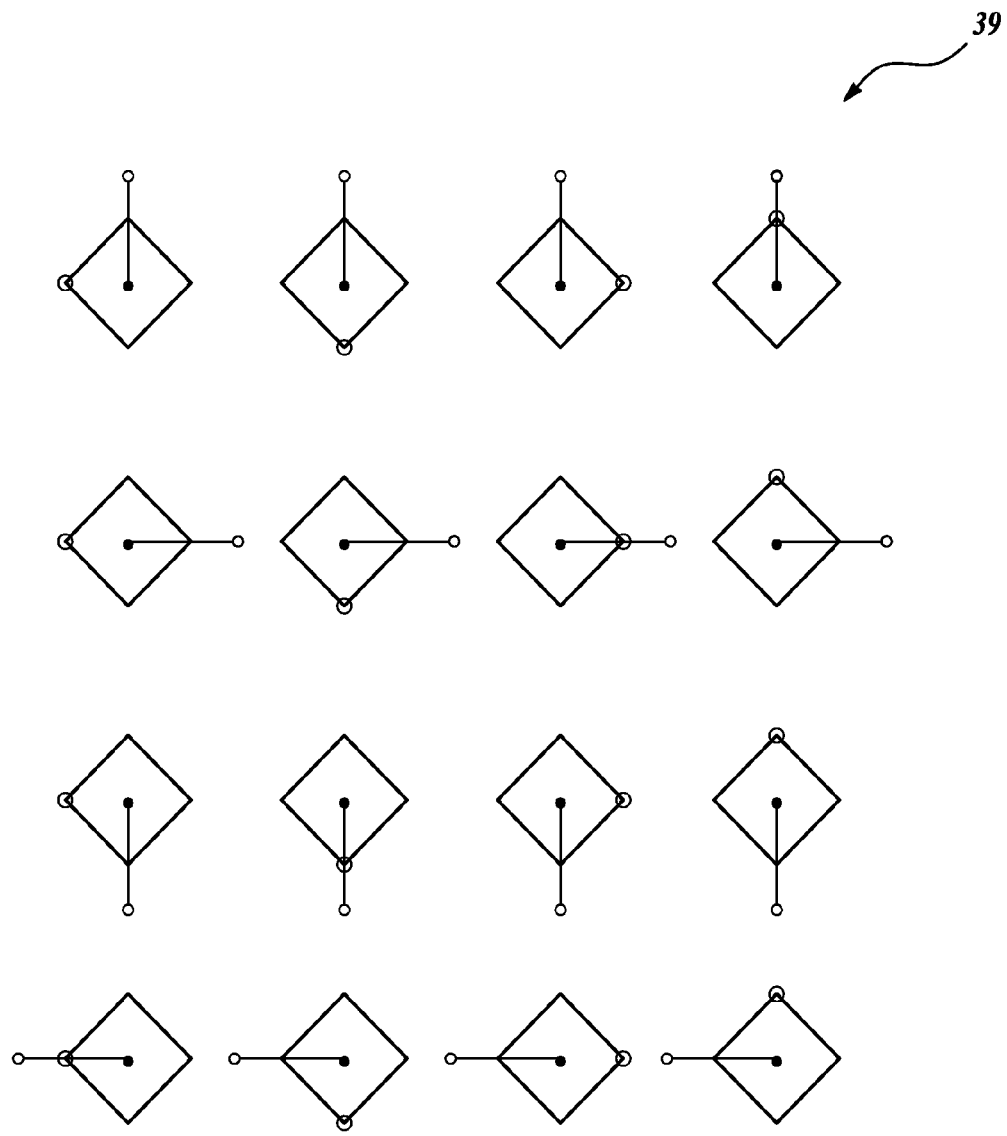
FIG. 3B illustrates an example of a set of geometric counting mechanisms for a hexadecimal numerals according to another embodiment.

In another embodiment, a set of geometric counting mechanisms may be created to represent symbols used in radix 16, or hexadecimal, computation. In one aspect of the embodiment, the symbols 0 to 9 and "a" to "f" that are usually used in base-16 computations are represented by a set of sixteen (16) geometric counting mechanisms representing the values 0 to 15. Each of the geometric counting mechanism in the set of sixteen has the same underlying geometric shape (or container geometry 12 in FIGS. 1A, 1B, and 1C) and fundamental unit (or primary multiplier), but each may include distinct secondary multiplier geometry and additive component geometry. FIGS. 3A and 3B illustrate examples of sets of geometric counting mechanism that represent values of zero to fifteen.

As shown in FIG. 3A, geometric counting mechanisms set 38 represent a Base-16 numeral system. In FIG. 3A, the first geometric shape, a triangle, is selected as the container geometry for set 38, therefore a base number of 3 applies to each geometric counting mechanism in set 38. The geometric shape in the center of each container geometry in FIG. 3A is a dot, and it is determined or predetermined that a dot represents a primary multiplier value of 1.

The second multipliers for the geometric counting mechanisms of set 38 illustrated in FIG. 3A are not identical. It is contemplated that different geometric shapes may be employed to embody the second multipliers in a set of geometric counting mechanisms. The second multiplier may correspond to the number of sides of the geometric shape arranged on the vertex of the container geometry, or it may be predetermined to be specific number. In FIG. 3A, a secondary multiplier that corresponds to a circle geometric shape is determined to be 1, a secondary multiplier that corresponds to a triangle geometric shape is determined to be 3, and a secondary multiplier that corresponds to a line is determined to be 2.

Each of the geometric counting mechanisms of set 38 in FIG. 3A may be decoded in a clockwise or counterclockwise direction depending on how their vertex designators are assigned. The resulting represented number when a geometric counting mechanism is decoded as a clockwise type may differ from when the represented number is decoded as a counter-clockwise type. Two numbers may be shown for each geometric counting mechanism in an X/Y format, the X indicating the represented number when it is decoded in a clockwise direction, and the Y indicating the represented number when it is decoded in a counter-clockwise direction. Set 38 in FIG. 3 may be referred to as a Hex_Set_3.

FIG. 3B illustrates a geometric counting mechanism set 39, which may be referred to as a Hex_Set_4. Like set 38 in FIG. 3A, the geometric counting mechanisms set 39 of represents a Base-16 numeral system. It differs from set 38 in FIG. 3A in its selection of a diamond as its container geometry. It is noted that in FIG. 3B, the geometric shapes corresponding to the first multiplier and to the second multiplier are identical for all of the geometric counting mechanisms in set 39.

Figure 4:
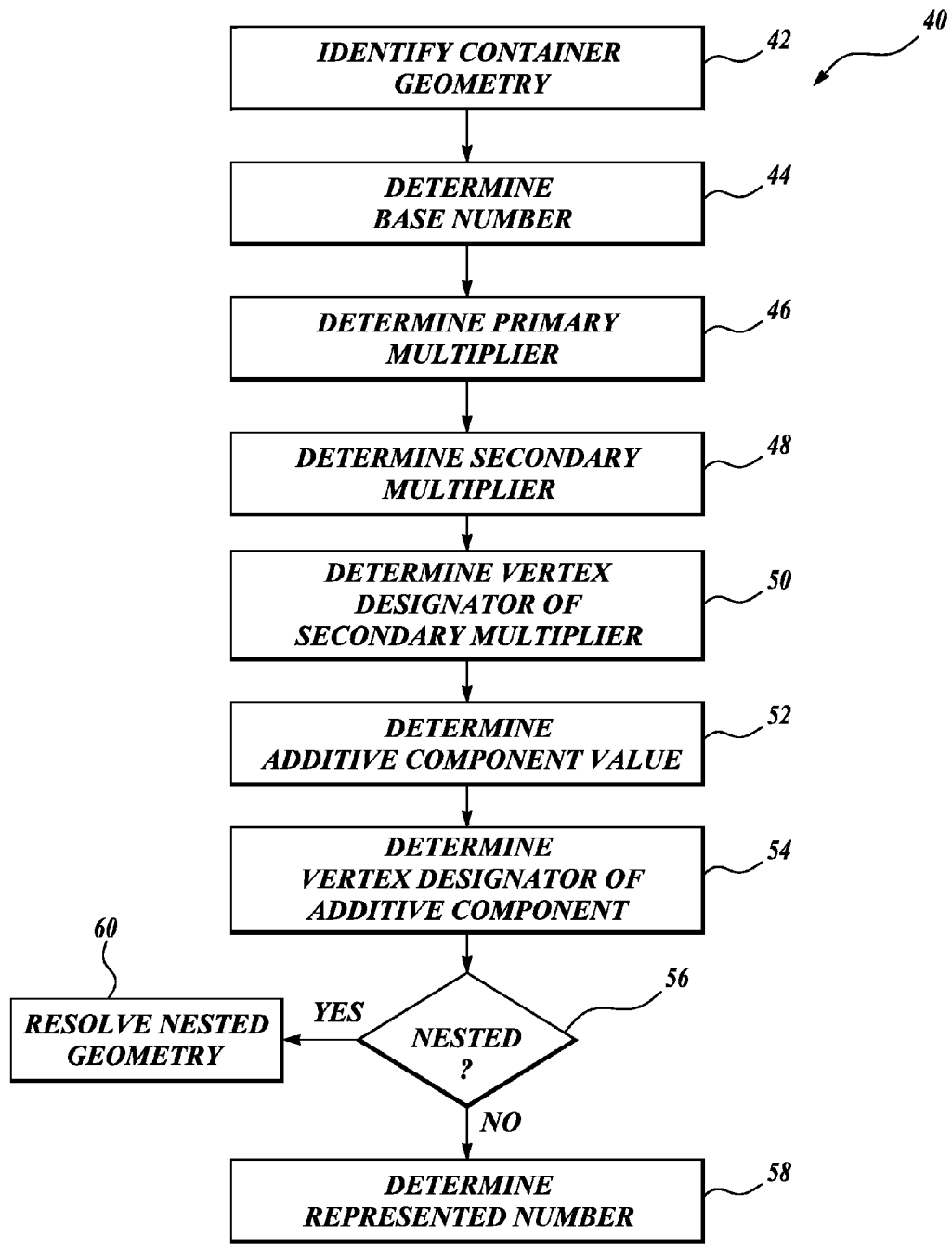
FIG. 4 is a logical flow diagram illustrating a process for decoding a geometric counting mechanism according to one embodiment.

FIG. 4 is a logical flow diagram illustrating process 40 for decoding and/or determining the number represented by a geometric counting mechanism, for example geometric counting mechanism 10. The process, as well as other processes described herein, are described for clarity in terms of operations performed in particular sequences by particular devices or elements of a system. A decoder, for instance, may be a stand alone device, or a subsystem in a device or an element of a larger system. A decoder may be implemented in hardware, firmware, software, or a combination thereof. It is noted, however, that this process and other processes described herein, are not limited to the specified sequences, devices, or elements. Certain processes may be performed in different sequences, in parallel, be omitted, or supplemented by additional processes, whether or not such different sequences, parallelism, or additional processes are described herein. The processes disclosed may also be performed on or by other devices, elements, or systems, whether or not such devices, elements, or system are described herein. These processes may also be embodied in a variety of ways, for example, on an article of manufacture, e.g. as a computer-readable instructions stored in a computer-readable storage medium, or be performed as a computer-implemented process. These processes may also be encoded as computer-executable instructions and transmitted via a communication medium.

As illustrated in FIG. 4, process 40 begins at 42 where a container geometry is identified in a geometric counting mechanism. The geometric counting mechanism may be received from a user, the user may be a sub-process, an element in a device, another device, an operator, or another system. The received geometric counting mechanism may be received as an input or internally generated. The geometric counting mechanism may include an arrangement of at least four geometric shapes. In one embodiment, the container geometry has a geometric shape that is larger than the other geometric shapes in the arrangement. In one aspect of the embodiment, the container geometry is a polygon, for example a triangle, a rectangle, and the like. A triangle may be identified as the container geometry of the geometric counting mechanism 10 in FIG. 1A, and a rectangle may be identified as the container geometry of the geometric counting mechanism in FIG. 1B.

Process 42 continues to 44 where a number associated with the identified container geometry, i.e. the base number, is determined. A polygon may be defined as a plane figure that is bounded by a finite number of straight line segments, or sides. In one embodiment, the number of sides on the identified container geometry is the base number of the geometric counting mechanism. For example, the base number of the geometric counting mechanism 10 in FIG. 1A may be 3 (three) because the triangle, the container geometry, has three sides. It is also possible to predetermine a base number for a geometric counting mechanism or a set of geometric counting mechanisms, in which case the base number may not be associated with the container geometry.

Process 44 continues to 46 where a primary multiplier is determined based on an identified second geometric shape. The second geometric shape in the geometric counting mechanism is preferably identified in the center of its container geometry. The second geometric shape may be a dot, a circle, a line, a triangle, a square, and the like. In one embodiment, the primary multiplier corresponds to the number of sides of the second geometric shape. The primary multiplier may be the fundamental unit of the geometric counting mechanism. It is contemplated, however, where the second geometric shape does not have a literal side, as in the case of a dot or a line, the primary multiplier may be determined or predetermined by a user, a subsystem, or a system, to be a particular number. For example, a secondary geometric shape of a dot may correspond to a primary multiplier of 1, and a secondary geometric shape of a line may correspond to a primary multiplier of 2.

Process 46 continues to 48 where a secondary multiplier is determined based on an identified third geometric shape. The third geometric shape in the geometric counting mechanism is preferably identified on one of the vertices of the container geometry. The third geometric shape may also be a dot, a circle, a line, a triangle, a rectangle, and the like. In one embodiment, the secondary multiplier corresponds to the number of sides of the third geometric shape. The secondary multiplier associated with a third geometric shape that does not have sides may be determined to be a particular number. For example, a third geometric of a dot may correspond to a secondary multiplier of 1, and a third geometric shape of a line may correspond to a secondary multiplier of 2.

Process 48 continue to 50 to determine the vertex designator of the third geometric shape, or the number associated with the vertex on which the third geometric shape was identified. The container geometry, a polygon, may contain a plurality of vertices, each of them may be assigned a vertex designator. In one embodiment, a vertex on the container geometry is assigned with vertex designator of 0, and depending on whether the geometric counting mechanism is a clockwise or counterclockwise type, the vertex to the left, or to the right of the vertex having vertex designator of 0 may be assigned vertex designator of 2. The assignment of vertex designators to the remaining vertices on the container geometry continues clockwise or counterclockwise, in an increasing count, until vertex designators are assigned to all the vertices on the container geometry.

Process 50 continues to 52 where a fourth geometric shape in the geometric counting mechanism is identified and the additive component value of the geometric counting mechanism is determined. The fourth geometric shape may be located external or outside the container geometry, but it may be linked to the second geometric shape in the center of the container geometry, the link passing through one of the vertices of the container geometry. The fourth geometric shape may be a circle, a line, a triangle, a rectangle, or other polygons. In one embodiment, the additive component value corresponds to the number of sides of the fourth geometric shape. A fourth geometric shape that does not have any side may be determined to correspond to a particular number for purposes of determining the additive component value, for example, a the fourth geometric shape of a line may correspond to an additive component value of 2, a fourth geometric shape of dot may correspond to an additive component value of 1.

Process 52 continue to 54 to determine the vertex designator value assigned to the vertex through which the fourth geometric shape is linked to the second geographic shape. In one embodiment, the fourth geometric shape is linked to the second geometric shape through a vertex that is distinct from the vertex on which the third geometric shape is located on the container geometry. In another embodiment, the fourth geometric shape is linked to the second geometric shape through the same vertex on which the third geometric shape is located on the container geometry.

Process 54 continues to 56 where the determination of whether the geometric counting mechanism is nested by evaluating whether the fourth geometric shape itself includes an arrangement of additional geometric shapes. A fourth geometric shape that includes an arrangement of a plurality of geometric shapes corresponds to a nested geometric counting mechanism. If the geometric counting mechanism is not nested, process 56 continues to 58.

In 58, the various values determined in processes 42 through 54 may be used to determined the number represented by the geometric counting mechanism. The base number, the primary multiplier, the secondary multiplier, the additive component value, and the determined vertex designators associated with the third geometric shape and fourth geometric shapes, may be used to calculate the represented number using the formula below:

$$N_R = (PM \times BN \times SM \times V_{SM}) + (PM \times AC \times V_{AC})$$

Details on each variable in the formula were given in earlier paragraphs.

Returning to process 56, if the geometric counting mechanism is determined to be nested process 56 continues to 60.

In 60, the nested geometry is resolved by treating the fourth geometric shape of the geometric counting mechanism as a nested container geometry, or a second level container geometry, which has the geometric shape of the fourth geometric shape. In one embodiment, the fourth geometric shape includes a fifth geometric shape in its center, a sixth geometric shape on one of its vertices, and a seventh geometric shape linked to the fifth geometric shape through one of its vertices. A nested primary multiplier, a nested secondary multiplier, and an additive component value may be determined through the processes similar to the processes 46, 48 and 52 for determining the primary multiplier, the secondary multiplier, and the additive component value of the geometric counting mechanism. In one aspect of the embodiment, the vertex designators associated with the sixth and seventh geometric shapes are determined in processes similar to processes 50 and 54. A determination whether the seventh geometric shape includes a further arrangement of a plurality of geometric shapes is made similar to process 56. An affirmative nesting determination causes process 60 to repeat. A negative determination causes process 40 to decode the geometric counting mechanism, taking into account the nested geometric shapes and their associated values. These values, together with the values determined in processes 42 through 54, may be used to calculate the represented number using the formula below:

$$N_R = (PM \times BN \times SM \times V_{SM}) + (PM \times ((NPM \times AC \times NSM \times NVSM) + (NPM \times AC \times NV_{AC})) \times V_{AC})$$

Details on each variable in the formula were given in earlier paragraphs.

Process 42 may conclude with the determined represented number being presented to the user; an operator, another process, a subsystem, another device, or another system. The determined represented number may also be presented as a visual display, as an audio, as a tactile output, or other means to present a number.

Figure 5:
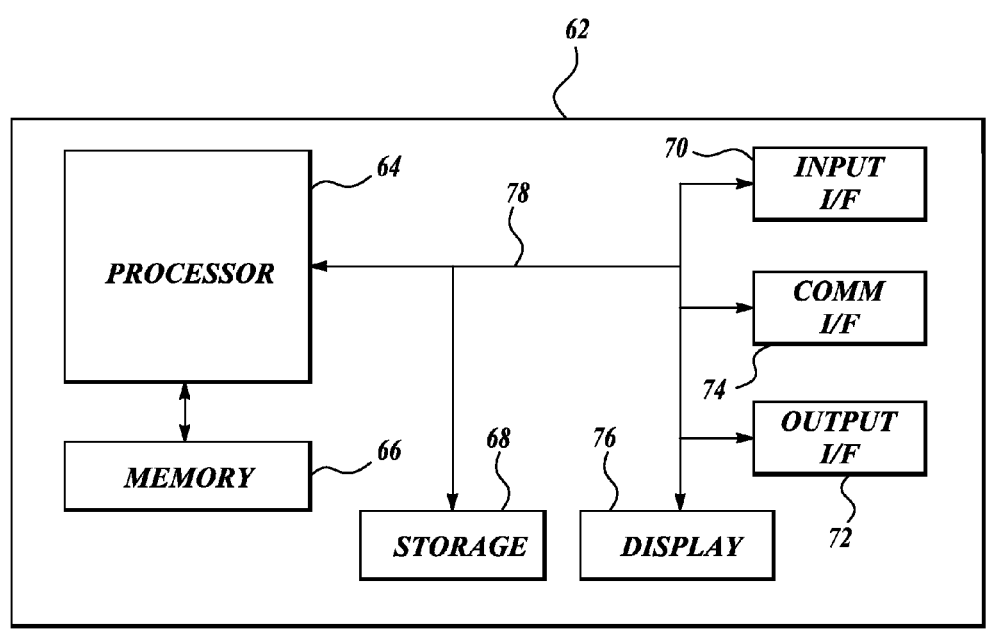
FIG. 5 is a block diagram illustrating example hardware components of a computing device according to aspects of the disclosure.

FIG. 5 is a high-level illustration of example hardware components of computing device 62, which may be used to practice various aspects of the disclosure. For example, computing device 62 may be employed to perform process 40 of FIG. 4. As shown, computing device 62 includes processor block 64, operating memory block 66, data storage memory block 68, input interface block 70, output interface block 72, communication interface block 74, and display component block 76. These aforementioned components may be interconnected by bus 78.

Computing device 62 may be virtually any type of general- or specific-purpose computing device. For example, computing device 62 may be a user device such as a desktop computer, a laptop computer, a tablet computer, a display device, a camera, a printer, or a smartphone. Likewise, computing device 62 may also be server device such as an application server computer, a virtual computing host computer, or a file server computer.

Computing device 62 includes at least one processor block 64 adapted to execute instructions, such as instructions for implementing the above-described processes. The aforementioned instructions, along with other data (e.g., datasets, metadata, operating system instructions, etc.), may be stored in operating memory block 66 and/or data storage memory block 68. In one example, operating memory block 66 is employed for run-time data storage while data storage memory block 68 is employed for long-term data storage. However, each of operating memory block 66 and data storage memory block 68 may be employed for either run-time or long-term data storage. Each of operating memory block 66 and data storage memory block 68 may also include any of a variety of data storage devices/components, such as volatile memories, semi-volatile memories, non-volatile memories, random access memories, static memories, disks, disk drives, caches, buffers, or any other media that can be used to store information. However, operating memory block 66 and data storage memory block 68 specifically do not include or encompass communications media, any communications medium, or any signals per se.

Also, computing device 62 may include or be coupled to any type of computer-readable media such as computer-readable storage media (e.g., operating memory block 66 and data storage memory block 68) and communication media (e.g., communication signals and radio waves). While the term computer-readable storage media includes operating memory block 66 and data storage memory block 68, this term specifically excludes and does not encompass communications media, any communications medium, or any signals per se.

Computing device 62 also includes input interface block 70, which may be adapted to enable computing device 62 to receive input from users or from other devices. In addition, computing device 62 includes an output interface block 72, which may be adapted to transmit data to display component block 76 to render displays. In one example, display component block 76 includes a frame buffer, graphics processor, graphics accelerator, or a virtual computing host computer and is adapted to render the displays for presentation on a separate visual display device (e.g., a monitor, projector, virtual computing client computer, etc.). In another example, display component block 76 includes a visual display device and is adapted to render and present the displays for viewing.

While illustrative embodiments have been illustrated and described, it will be appreciated that various changes can be made therein without departing from the spirit and scope of the disclosed technology; the technology can be practiced in many ways. Particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. A method for decoding a geometric counting mechanism in a decoding device to determine a represented number, the method comprising:
   receiving at a decoding device, a geometric counting mechanism comprising an arrangement of geometric shapes, the arrangement of geometric shapes representing the represented number;
   identifying a first geometric shape that is a polygon in the geometric counting mechanism;
   determining a base number that corresponds to a number of sides of the identified polygon;
   determining a first multiplier that corresponds to a second geometric shape in the center of the polygon;
   determining a second multiplier that corresponds to a third geometric shape on a first vertex of the polygon;
   determining an additive component value that corresponds to a fourth geometric shape linked to the second geometric shape through a second vertex of the polygon; and
   determining the represented number using at least the determined base number, first multiplier, second multiplier, and additive component value.

2. The method of claim 1, further comprising:
   determining a first number based on a location of the first vertex in the polygon; and
   determining a second number based on a location of the second vertex in the polygon,
   wherein the polygon includes a plurality of vertices, and a plurality of numbers are assigned to the vertices in an increasing order in one of clockwise and counter-clockwise direction.

3. The method of claim 2, wherein determining the represented number comprises:
   multiplying the first multiplier with the base number, the second multiplier, and the first number to obtain a first component of the represented number;
   multiplying the first multiplier with the additive component value and the second number to obtain a second component of the represented number; and
   adding the first component to the second component.

4. The method of claim 1, wherein the first multiplier is a number of sides of the second geometric shape.

5. The method of claim 1, wherein the second multiplier is a number of sides of the third geometric shape.

6. The method of claim 1, wherein the additive component value is a number of sides of the fourth geometric shape.

7. The method of claim 1, wherein at least one of the first multiplier, the second multiplier, and the additive component value is determined by a user.

8. The method of claim 1, wherein the second vertex coincides with the first vertex, and the second number is equal to the first number.

9. A non-transient computer-readable storage medium having instruction stored therein for performing a process of decoding a geometric counting mechanism to a represented number, the process comprising:
   receiving a geometric counting mechanism comprising an arrangement of geometric shapes;

identifying a first geometric shape that is a polygon in the geometric counting mechanism;

determining a base number that corresponds to a number of sides of the identified polygon;

determining a first multiplier that corresponds to a second geometric shape in the center of the polygon;

determining a second multiplier that corresponds to a third geometric shape on a first vertex of the polygon;

determining an additive component value that corresponds to a fourth geometric shape linked to the second geometric shape through a second vertex of the polygon; and determining the represented number using at least the base number, the first multiplier, the second multiplier, and the additive component value.

10. The computer-readable storage medium of claim 9, wherein the process further comprises:

determining a first number based on a location of the first vertex in the polygon; and determining a second number based on a location of the second vertex in the polygon, wherein the polygon includes a plurality of vertices, and a plurality of numbers are assigned to the vertices in an increasing order in one of clockwise and counterclockwise direction.

11. The computer-readable storage medium of claim 10, wherein determining the represented number comprises:

multiplying the first multiplier with the base number, the second multiplier, and the first number to obtain a first component of the represented number;

multiplying the first multiplier with the additive component value and the second number to obtain a second component of the represented number; and adding the first component to the second component.

12. The computer-readable storage medium of claim 9, wherein the first multiplier is a number of sides of the second geometric shape.

13. The computer-readable storage medium of claim 9, wherein the second multiplier is a number of sides of the third geometric shape.

14. The computer-readable storage medium of claim 9, wherein the additive component value is a number of sides of the fourth geometric shape.

15. A computing device for decoding a geometric counting mechanism into a represented number comprising:

a memory and processing blocks that are respectively adapted to store and execute instructions, including instructions that:

identify a first geometric shape in the geometric counting mechanism comprising an arrangement of geometric shapes, the arrangement of geometric shapes representing the represented number, the first geometric shape being a polygon;

determine a base number that corresponds to a number of sides of the identified polygon;

determine a first multiplier that corresponds to a second geometric shape in the center of the polygon;

determine a second multiplier that corresponds to a third geometric shape on a first vertex of the polygon;

determine an additive component value that corresponds to a fourth geometric shape linked to the second geometric shape through a second vertex of the polygon; and determine the represented number using at least the base number, the first multiplier, the second multiplier, and the additive component value.

16. The computing device of claim 15, wherein the instructions further includes instructions that:

determine a first number based on a location of the first vertex in the polygon; and determine a second number based on a location of the second vertex in the polygon, wherein the polygon includes a plurality of vertices, and a plurality of numbers are assigned to the vertices in an increasing order in one of clockwise and counterclockwise direction.

17. The computing device of claim 16, wherein the instructions that determine the represented number:

multiply the first multiplier with the base number, the second multiplier, and the first number to obtain a first component of the represented number;

multiply the first multiplier with the additive component value and the second number to obtain a second component of the represented number; and adding the first component to the second component.

18. The computing device of claim 16, wherein the first multiplier is a number of sides of the second geometric shape, and wherein the additive component value is a number of sides of the fourth geometric shape.

19. The computing device of claim 16, wherein the second vertex coincides with the first vertex, and the second number is equal to the first number.

20. The computing device of claim 16, further comprising:

an input block adapted for receiving the geometric counting mechanism; and an output block for presenting the represented number.

* * * * *